April 9, 1946.  R. B. ELLIOTT  2,398,177
LOADING MACHINE
Filed Jan. 12, 1945   2 Sheets-Sheet 1

INVENTOR.
Richard B. Elliott
BY
ATTORNEYS

April 9, 1946.  R. B. ELLIOTT  2,398,177
LOADING MACHINE
Filed Jan. 12, 1945  2 Sheets-Sheet 2
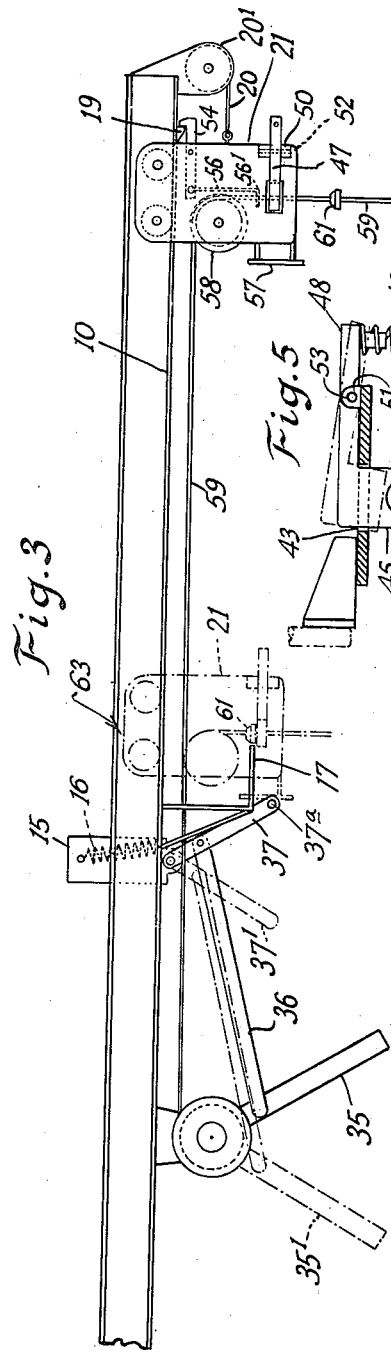
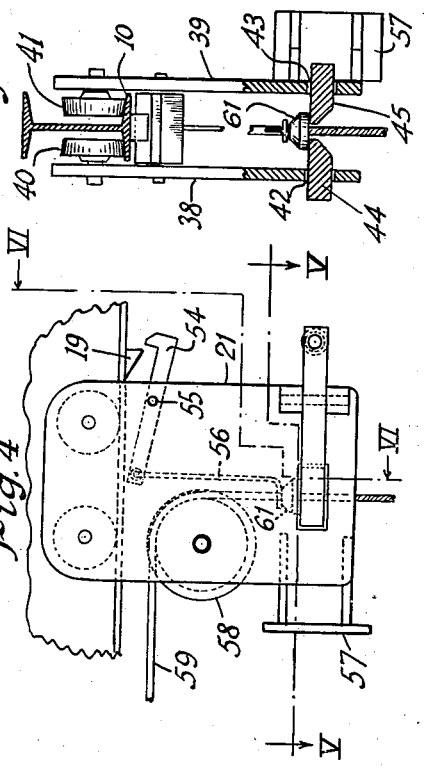
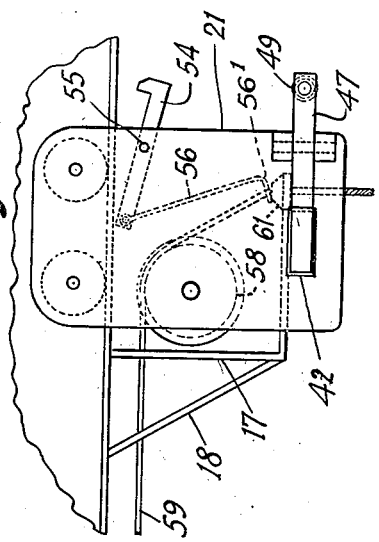
INVENTOR
Richard B. Elliott
BY
Burgess Ryan & Hicks
ATTORNEY Patented Apr. 9, 1946

2,398,177

UNITED STATES PATENT OFFICE 2,398,177

LOADING MACHINE

Richard B. Elliott, Sidney, Ohio, assignor to Robins Conveyors Incorporated, Passaic, N. J., a corporation of New Jersey Application January 12, 1945, Serial No. 572,514

3 Claims. (Cl. 212—84)

This invention relates to a loading and conveying device of the type adapted to hoist a load at one place, and transport it to and deposit it at another. A primary object of the invention is to provide an inexpensive and practical loading and conveying device of the type described in which the load is both mechanically hoisted and locked in place and in which the subsequent transporting, stopping, and discharging of the load are also wholly mechanical. Other objects and advantages will hereinafter appear.

In one form of the invention, and as described and illustrated in the following description and accompanying drawings, the device is specially useful in hoisting flasks containing heavy sand castings and depositing them on a shake-out or vibrating deck where the casting is shaken free of the sand, but the invention is applicable generally to hoisting and conveying problems, as will become apparent. In this preferred form the invention comprises a superstructure fastened to the shakeout and including track means for passage of a movable trolley thereon between a loading position and a discharge position, a power-driven cable hoisting drum having a cable wound thereon which engages the trolley, and various mechanically operated control means for hoisting, locking, transporting, stopping, and discharging the load, and preparing the device to handle another load.

The invention may be better understood by referring to the drawings, in which

Fig. 3 is a detailed side elevational view of certain features of the loader;

Figs. 4 and 7 are enlarged side elevational views of the trolley at its loading and discharging positions, respectively;

Fig. 5 is an enlarged plan view, partly in section, along the line V—V of Fig. 4; and Fig. 6 is an enlarged rear elevational view, partly in section, along the line VI—VI of Fig. 4.

Figure 1:
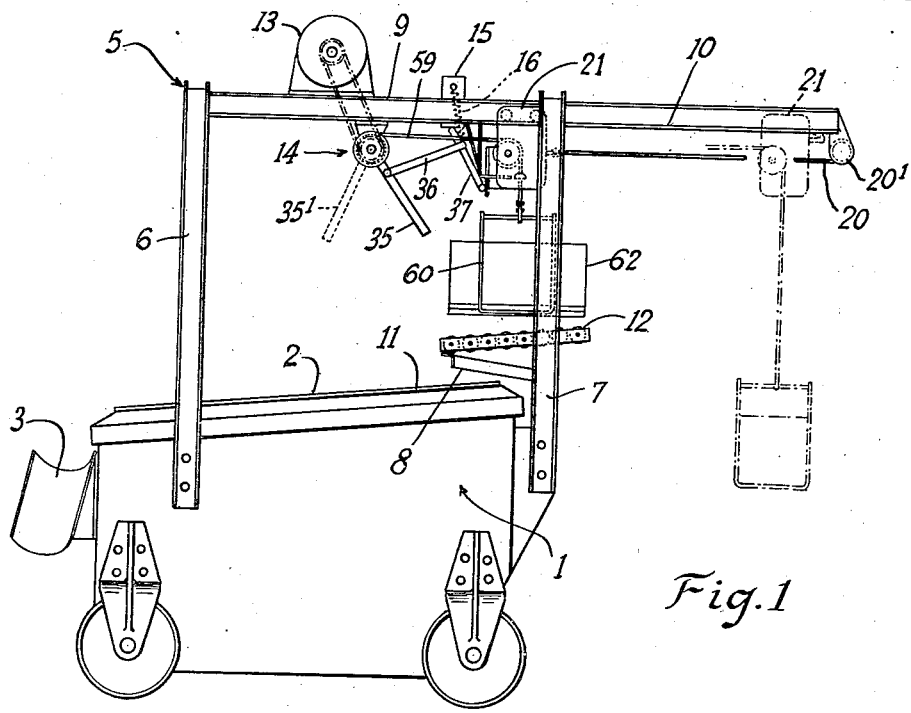
Fig. 1 is a side elevational view of the loader and shakeout.
Figure 2:
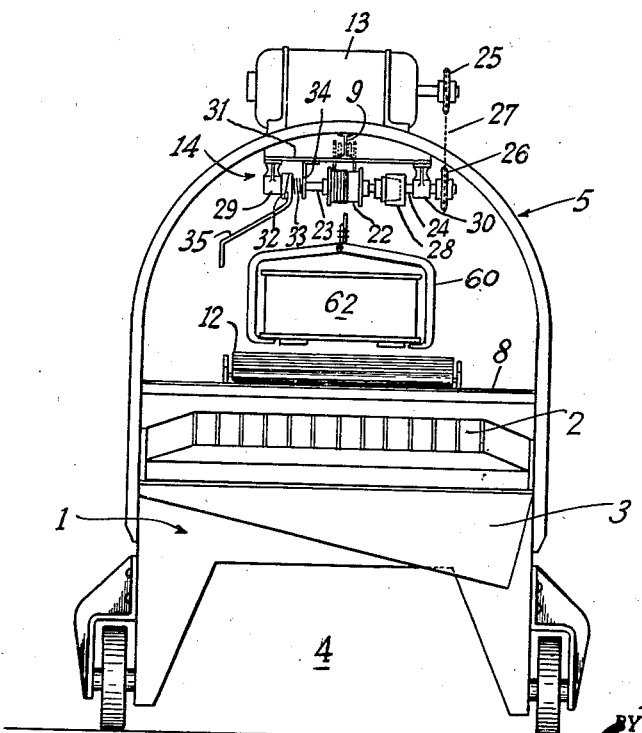
Fig. 2 is a front elevational view of the loader and shakeout.

The shakeout, generally designated 1, may be of any preferred construction, being shown in the instance as including a deck or grating 2 adapted to be vibrated by any suitable mechanism (not shown), and a chute 3 for the removal of the sand-free castings. The loose sand falls through the grating to the space 4 underneath the shakeout.

Rigidly mounted on the shakeout is a superstructure, generally designated 5, comprising upright frame members 6, 7, a cross member 8 secured to the upright 7, and a member generally designated 9, having suitable track means 10, located above the shakeout and extending outwardly from the feed end 11 thereof. The cross member 8 supports a roller platform 12, located adjacent the feed end of the shakeout. The member 9, shown as an ordinary I-beam, of which the lower flanges constitute the track means, provides support for an electric motor 13; a cable hoisting drum assembly generally indicated as 14; a fixed plate 15 to which is secured one end of a snap-action spring 16; release means, shown as an L-shaped bracket 17 braced by a strut 18 (Fig. 7); catch means 19 (Figs. 3 and 4); a trolley 21 and biasing means therefor, suitably in the form of a cable 20 of which one end is secured to the trolley and the other end to a spring pulley 20'.

The cable hoisting drum assembly 14 comprises a hoisting drum 22 fixedly mounted on the shaft 23; a shaft 24 driven from motor 13 by means of the sprockets 25, 26 and the chain 27; and clutch means, such as a cone type clutch 28 connecting shafts 23 and 24. Journal brackets 29 and 30 support the shafts 23 and 24 from a plate 31, which is in turn secured to the I-beam 9. Rotation of the shaft 23, and therefore the hoisting drum 22, is shown controlled by a face-cam and spring 32, 33 and a fixed plate 34 which one end of spring 33 abuts. Manually operated power control means, shown as a clutch lever 35, are attached to the cam 32. When this lever is in the position shown by broken lines, denoted as 35' (Figs. 1 and 3), the shaft 23 is disengaged from the shaft 24, and consequently the drum 22 is free to rotate independently of the motor; however, when the lever is in the position denoted by solid lines, shaft 23 is engaged through the clutch with shaft 24, and the drum 22 is rotated by the motor in a direction to wind the cable 59. The clutch lever 35 is connected by link 36 to mechanically operated power control means in the form of a lever 37, which is also pivotally connected to the plate 15. As in the case of lever 35, drum 22 will be free to rotate when lever 37 is in the broken line position, denoted 37'; the drum will be rotated by the motor when lever 37 is in solid line position. The lower end of snap-action spring 16 is connected to lever 37.

The trolley 21 comprises two side plates 38, 39 (Fig. 6), each having a pair of rollers 40, 41 secured to their upper inside surfaces for travel along the track 10. The plates are slotted or cut out at their lower ends, as at 42, 43 to receive the jaws 44, 45 of a pair of latch members 47, 48 urged toward each other by a spring 49. The latch members are pivotally mounted on the side plates by means of blocks 50, 51, and pins 52, 53. Trolley latch means in the form of a latch 54 is pivotally secured between the side plates by pin 55, one end of said latch being adapted to engage the catch 19 on track means 10, and the other end being loosely fastened to cable-actuated latch release means, shown as a tripping rod 56 having a loop 56' at its lower end encircling the cable 59. A bumper plate 57 is attached to the lower front end of the trolley in position to engage a bar 37a carried by the lower end of lever 37 (Fig. 3); and between the trolley side plates is journalled a hoist pulley 58 over which the cable 59 from drum 22 passes, the free end of the cable being fastened to suitable load supporting means such as the tongs 60. At a point suitably distant from the tongs the cable is provided with a fixed button 61, which is simply an enlargement on the cable tapered on its upper side.

In operation, the trolley is first brought to its loading position at the outer end of the I-beam where it is held by latch 54. The tongs 60 are made fast to a load 62 and the clutch lever 35 is then manually moved or snapped over to the position shown by the solid lines to engage shaft 23 with the rotating shaft 24 by means of the clutch 28, thereby to rotate drum 22 and raise the load. The button 61 is so located on cable 59 that when it reaches the trolley, the load 62 is at such a height as to permit it to be moved in above the roller platform 12. As the load is raised, the button 61 engages and pushes latch members 47, 48 apart (Fig. 5), the lower adjacent edges of the jaws being beveled to facilitate its entry between them (Fig. 6). As the button emerges from the jaw opening, the jaws close behind it, thereby locking the load against descent relatively to the trolley. Shortly thereafter the button strikes the tripping rod 56 which, in turn, acts to release the latch 54 from engagement with the catch 19. Thereupon the continued winding of the cable 59 draws the trolley inwardly on the track 10, the relatively light opposition offered by the spring 20' yielding and paying out the cable 20.

As the trolley approaches the discharge position, generally indicated as 63 in Fig. 3, the bumper plate 57 strikes the bar 37a and continued movement of the trolley snaps the levers 37, 35 to their positions 37', 35', thus disengaging the hoisting drum 22 from the motor. The tendency of the cable to unwind at the discharge position of the trolley would be checked by the engagement of the underside of button 61 with the top of jaws 44, 45, but just prior to the trolley reaching the limit of its inward movement, the button 61 is engaged by the free end of bracket 17 and is pushed off the jaws 44, 45 (Fig. 7), allowing the cable to unwind and the load 62 to drop to the roller platform 12 where it is disengaged by the operator from the tongs and moved to the vibrating deck 2 of the shakeout. The trolley relieved of its load, is then automatically returned to its loading position by the action of cable 20 and its spring pulley 20'.

As will be apparent, the invention thus makes it possible to load the shakeout rapidly and continuously and with a minimum amount of handling of both the flasks and the loader by the operator.

While the foregoing comprises a specific description of one form which the invention may assume in practice, it will be understood that this form is shown for purpose of illustration, and that the principles of the invention are of general application in the loading and conveying art. The following is claimed.

I claim:

1. In a shakeout having a vibrating deck, the combination of a superstructure supported above the deck including elevated track means extending outwardly beyond the feed end of the deck, a trolley movable along said track means between a loading position adjacent the outer end thereof and a discharge position above said feed end of the deck, and a hoist pulley mounted on the trolley; a power-driven cable hoisting drum mounted on the superstructure and a cable extending from the drum and trained over said pulley; trolley latch means for maintaining the trolley in its said loading position; power-control means manually operable for applying power to said power-driven cable hoisting drum; cable lock means for locking a load against descent relatively to said trolley; cable-actuated means for releasing said trolley latch means to free the trolley for inward movement on the track means; means engaged by the trolley for shutting off power driven to said power-cable hoisting drum at said trolley discharge position; release means responsive to movement of the trolley for releasing the load from said cable lock means, thereby to release the load upon said vibrating deck; and means located at the outer end of said track means for returning the trolley to its loading position in response to release of the load.

2. Combination according to claim 1 in which said cable lock means includes a latch and an enlargement on the cable engageable therewith.

3. In a flask conveying apparatus having a deck for supporting said flask, the combination of a superstructure supported above the deck including elevated track means extending outwardly beyond the deck, a trolley movable along said track means between a loading station adjacent one end thereof and a discharge station, and a hoist pulley mounted on the trolley; power-driven cable withdrawal means mounted on the superstructure and a cable extending from said means and trained over said pulley; power-control means manually operable for applying power to said power-driven cable withdrawal means; cable lock means for positioning a load relatively to said trolley; means engaged by the trolley for shutting off power to said power-driven cable withdrawal means at said trolley discharge station; cable-actuated means engageable with and releasable from the load; and means located at the end of said track means for returning the trolley to its loading station in response to release of the load.

RICHARD B. ELLIOTT.